(12) United States Patent
Ouyang et al.

(10) Patent No.: US 8,773,090 B2
(45) Date of Patent: Jul. 8, 2014

(54) VOLTAGE REGULATOR WITH ADAPTIVE HYSTERETIC CONTROL

(75) Inventors: Qian Ouyang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 355 days.

(21) Appl. No.: 13/175,543

(22) Filed: Jul. 1, 2011

(65) Prior Publication Data

US 2012/0001603 A1 Jan. 5, 2012

(30) Foreign Application Priority Data

Jul. 2, 2010 (CN) .......................... 2010 1 0215896

(51) Int. Cl.
*G05F 1/618* (2006.01)
(52) U.S. Cl.
USPC .......................................... 323/271; 323/284
(58) Field of Classification Search
USPC .......................................... 323/224, 271, 284
See application file for complete search history.

(56) References Cited

U.S. PATENT DOCUMENTS

| | | |
|---|---|---|
| 6,348,780 B1 | 2/2002 | Grant |
| 6,885,175 B2 * | 4/2005 | Mihalka .................... 323/282 |
| 8,008,902 B2 * | 8/2011 | Melanson et al. ............ 323/285 |
| 2010/0134080 A1 | 6/2010 | Ouyang |
| 2010/0181983 A1 | 7/2010 | Ouyang |

OTHER PUBLICATIONS

H.-H. Huang, C.-L. Chen, and K.-H. Chen, "Adaptive window control (AWC) technique for hysteresis DC-DC buck converters with improved light and heavy load performance," IEEE Trans. Power Electron., vol. 24, No. 6, pp. 1607-1617, Jun. 2009.*
Xiaohui Wu, Xiabo Wu, "Adaptive Hysteresis Window Control (AHWC) Technique for Hysteretic DC-DC Buck Converter with Constant Switching Frequency", Power and Energy Engineering Conference (APPEEC), 2010 Asia-Pacific.*

* cited by examiner

*Primary Examiner* — Adolf Berhane
*Assistant Examiner* — Jye-June Lee
(74) *Attorney, Agent, or Firm* — Perkins Coie LLP

(57) ABSTRACT

A voltage regulator with adaptive hysteretic control. The voltage regulator may include a top switch (e.g., MOSFET) configured to couple a power supply supplying an input voltage to a load. An adaptive hysteretic control circuit of the voltage regulator may turn on the top switch when the feedback voltage reaches the low threshold and turn off the top switch when the feedback voltage reaches the high threshold. The adaptive hysteretic control circuit may adjust the upper and lower threshold to make the voltage regulator working like a constant on time control circuit in steady state. When a step down transient happens, the top switch could be turned off when the output voltage reaches the upper threshold, and when a step up transient happens, the top switch could be turned on when the output voltage reaches the lower threshold, it makes the voltage regulator working like a hysteretic control circuit.

17 Claims, 6 Drawing Sheets

VOLTAGE REGULATOR WITH ADAPTIVE HYSTERETIC CONTROL

CROSS-REFERENCE TO RELATED APPLICATION(S)

This application claims priority to and the benefit of Chinese Patent Application No. 201010215896.7, filed Jul. 2, 2010, which is incorporated herein by reference in its entirety.

TECHNICAL FIELD

The present disclosure relates generally to electrical circuits, and more particularly but not exclusively to voltage regulators.

BACKGROUND

A voltage regulator generates a regulated output voltage VOUT from an input voltage VIN. Ideally, the voltage regulator maintains the output voltage VOUT within regulation despite varying load current. The most desirable attributes of the voltage regulator include immediate response, inherent power supply stability, and fixed frequency. There are several methods of controlling the voltage regulator. PWM (pulse width modulation) control, hysteretic control and COT (constant on time) control are the most common control methods used in the voltage regulators, and each of them has its advantages and disadvantages.

The voltage regulators with PWM control work with fixed frequency, wherein the input is connected to the output according to the pulse width of the switching signal. By adjusting the pulse width of the switching signal, the output voltage is regulated. The drawback of the voltage regulator with PWM control is that it should be slowed down to prevent circuit instabilities and could not achieve fast transient response.

The voltage regulators with hysteretic control feedback the output voltage to a window comparator. With an upper threshold which is corresponding to the maximum value of the output voltage and a lower threshold which is corresponding to the minimum value of the output voltage, the feedback signal is maintained within the upper and the lower bounds of the window, and the output voltage is then maintained in a preset range. The voltage regulator with hysteretic control has fast transient response and inherent stability, but its frequency is varying.

The voltage regulators with constant on time control have the advantages of hysteretic control and seamless transition when the load changes, but the frequency of COT control is still variable with the input voltage and the output voltage because the off time is variable.

FIG. 1 schematically shows a prior art voltage regulator 100 with hysteretic control. The voltage regulator 100 comprises a hysteretic control circuit 103 that may be a window comparator. An output voltage feedback signal 112 is coupled to the window comparator 103. The window comparator 103 compares the output voltage feedback signal with an upper threshold and a lower threshold of the window comparator 103, and generates signals to toggle a main switch to supply power to the output based on the comparison.

FIG. 2 shows an example timing diagram of the output voltage waveforms in a voltage regulator under different conditions. In FIG. 2, all waveforms represent ripples of the output voltages for different input voltages (VIN) and a set output voltage VOUT for a buck regulator, which is a typical application for the voltage regulator. In FIG. 2, assuming waveform "a" has a higher value of VIN than the other waveforms ("b", "c", and "d"). Persons of ordinary skill in the art should know that the rising slopes of the ripples are proportional to (VIN-VOUT)/L, and the falling slopes of the ripples are proportional to -VOUT/L, wherein L represents the inductance of the output inductor. In addition, $V_{rip}$ represents the ripple value of waveforms "a" and "b." As is seen from FIG. 2, the rising slope of the waveform "a" is steeper than the rising slope of the waveform "b", which means the waveform "a" has a higher input voltage; and the falling slopes of the waveforms "a" and "b" are same because of their same output voltage. Thus the waveform "a" needs less time to traverse upward through the window than the waveform "b" (Ts1<Ts2), and the frequency of the waveform "a" is higher than the frequency of the waveform "b." It is concluded that the frequency of the voltage regulator 100 with hysteretic control is varied with the input voltage when the output voltage is set. Waveforms "c" and "d" are supposed to have same cycle time with waveform "b" because of their same input voltages and output voltages. But in FIG. 2, waveform "c" has a lower maximum value Vmax' of the output voltage than the lower maximum value Vmax of waveform "b", so waveform "c" takes less time to traverse upward through the window than the waveform "b." Waveform "d" has a higher minimum value Vmin' than the minimum value Vmin of waveform "b", so waveform "d" takes less time to traverse upward through the window than the waveform "b", too. The cycle time of the waveforms "c" and "d" may be the same with the cycle time of the waveform "a" which has a higher input voltage, if a suitable maximum value of the waveform "c" and a suitable minimum value of the waveform "d" are selected. So by varying either the maximum value or the minimum value of the output voltage or both of them, the fixed frequency can be achieved even when the input voltage is varying.

The present disclosure provides a voltage regulator with adaptive hysteretic control.

SUMMARY

It is an object of the present disclosure to provide a voltage regulator having fixed frequency, fast transient response and inherent stability.

In accomplishing the above and other objects, there has been provided, in accordance with an embodiment of the present disclosure, a voltage regulator, comprising: an input port configured to receive an input signal; an output port configured to provide an output voltage; a first switch and a second switch coupled in series between the input port and ground, wherein the first and second switches are synchronously switched; an adaptive hysteretic control circuit having a first input terminal, a second input terminal, a first output terminal, and a second output terminal, wherein the first input terminal is coupled to an output voltage feedback signal indicative of the output voltage, the second input terminal is coupled to a switching signal, and wherein based on the output voltage feedback signal and the switching signal, the adaptive hysteretic control circuit generates a first control signal at the first output terminal, and a second control signal at the second output terminal; and a logic circuit having a first input terminal, a second input terminal, and at least one output terminal, wherein the first input terminal is coupled to the first output terminal of the adaptive hysteretic control circuit to receive the first control signal, the second input terminal is coupled to the second output terminal of the adaptive hysteretic control circuit to receive the second control signal, and wherein based on the first control signal and the second control signal, the logic circuit generates the switching signal at the output terminal to control the first switch and the second switch.

In addition, there has been provided, in accordance with an embodiment of the present disclosure, a method of controlling a voltage regulator, comprising: using a lower threshold to control a switching signal to turn on a top switch of a voltage regulator, wherein the top switch of the voltage regulator is configured to couple a power supply to the load of the voltage regulator; using an upper threshold to control the switching signal to turn off the top switch of the voltage regulator, wherein the upper threshold is higher than the lower threshold, and wherein the upper threshold is fixed; providing a constant on time signal; generating the lower threshold in response to the constant on time signal, the switching signal, and the upper threshold; deriving an output voltage feedback signal from the output voltage; and generating the switching signal in response to the output voltage feedback signal, the lower threshold, and the upper threshold.

Furthermore, there has been provided, in accordance with an embodiment of the present invention, a method of controlling a voltage regulator, comprising: using an upper threshold to control a switching signal to turn off a top switch of a voltage regulator, wherein the top switch of the voltage regulator is configured to couple a power supply to the load of the voltage regulator; using a lower threshold to control the switching signal to turn on the top switch of the voltage regulator, wherein the lower threshold is lower than the upper threshold, and wherein the lower threshold is fixed; providing a constant on time signal; generating the upper threshold in response to the constant on time signal, the switching signal, and the lower threshold; deriving an output voltage feedback signal from the output voltage; and generating the switching signal in response to the output voltage feedback signal, the lower threshold and the upper threshold.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 3:
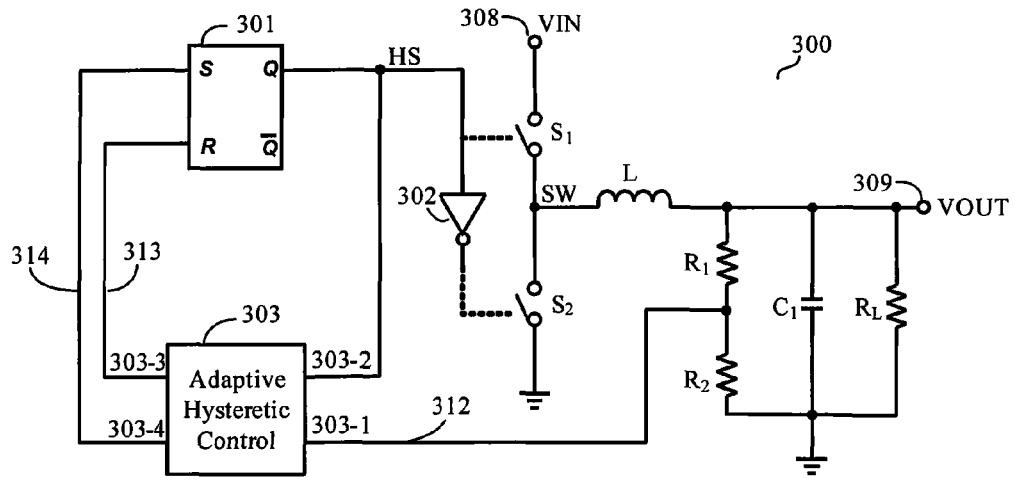
FIG. 3 schematically shows a voltage regulator 300 with adaptive hysteretic control in accordance with an embodiment of the present disclosure.

FIG. 3 schematically shows a voltage regulator 300 with adaptive hysteretic control in accordance with an embodiment of the present disclosure. In the example of FIG. 3, the voltage regulator 300 comprises a buck regulator that takes an input voltage VIN to generate an output voltage VOUT. Compared to the voltage regulator 100 with hysteretic control in FIG. 1, the voltage regulator 300 in FIG. 3 comprises an adaptive hysteretic control circuit 303 instead of the hysteretic control circuit 103 in FIG. 1. The voltage regulator 300 comprises: an input port 308 configured to receive an input signal VIN; an output port 309 configured to provide an output voltage VOUT; a first switch $S_1$ and a second switch $S_2$ coupled in series between the input port and ground, wherein the first and second switches are synchronously switched; an adaptive hysteretic control circuit 303 having a first input terminal 303-1, a second input terminal 303-2, a first output terminal 303-3, and a second output terminal 303-4, wherein the first input terminal 303-1 is coupled to an output voltage feedback signal 312 indicative of the output voltage VOUT, the second input terminal 303-2 is coupled to a switching signal HS, and wherein based on the output voltage feedback signal 312 and the switching signal HS, the adaptive hysteretic control circuit 303 generates a first control signal 313 at the first output terminal 303-3, and a second control signal 314 at the second output terminal 303-4; and a logic circuit 301 having a first input terminal R, a second input terminal S, and at least one output terminal Q, wherein the first input terminal R is coupled to the first output terminal 303-3 of the adaptive hysteretic control circuit 303 to receive the first control signal 313, the second input terminal S is coupled to the second output terminal 303-4 of the adaptive hysteretic control circuit 303 to receive the second control signal 314, and wherein based on the first control signal 313 and the second control signal 314, the logic circuit 301 generates the switching signal at the output terminal Q to control the first switch $S_1$ and the second switch $S_2$.

Persons of ordinary skill in the art should know that the upper threshold is corresponding to the maximum value of the output voltage, and the lower threshold is corresponding to the minimum value of output voltage.

In one embodiment, the logic circuit 301 comprises a RS flip-flop.

In one embodiment, the voltage regulator 300 further comprises a voltage divider comprised by a first resistor $R_1$ and a second resistor $R_2$ coupled to the output port to provide the output voltage feedback signal.

In one embodiment, the switches $S_1$ and $S_2$ comprise synchronously switched transistors (e.g., MOSFET). The node between the first switch $S_1$ and the second switch $S_2$ is also referred to as "the switching node SW." An inverter 302 allows the second switch $S_2$ to be off (i.e., open) when the first switch $S_1$ is turned on (i.e., closed), and to be on when the first switch $S_1$ is turned off. The first switch $S_1$ is turned on to allow the input power supply providing the input voltage VIN to charge an output capacitor $C_1$ and source current to a load $R_L$ through an output inductor L, and thereby increase the voltage across the load $R_L$. The first switch $S_1$ is turned off to stop providing the input voltage VIN, and the output capacitor $C_1$ sources current to the load $R_L$. Thereby the voltage across the capacitor $C_1$ decreases over time. The output capacitor $C_1$ is also referred to as "the first capacitor." The output voltage feedback signal 312, based on the output voltage, is fed back to the adaptive hysteretic control circuit 303, and the adaptive hysteretic control circuit 303 controls the switching of the switches $S_1$ and $S_2$ to maintain the output voltage VOUT within the maximum value and the minimum value limits of the output voltage VOUT. Persons of ordinary skill in the art should realize that the bottom switch $S_2$ may be replaced by a diode, and the inverter 302 may be omitted in that case, without detracting the merits of the present disclosure.

Figure 1:
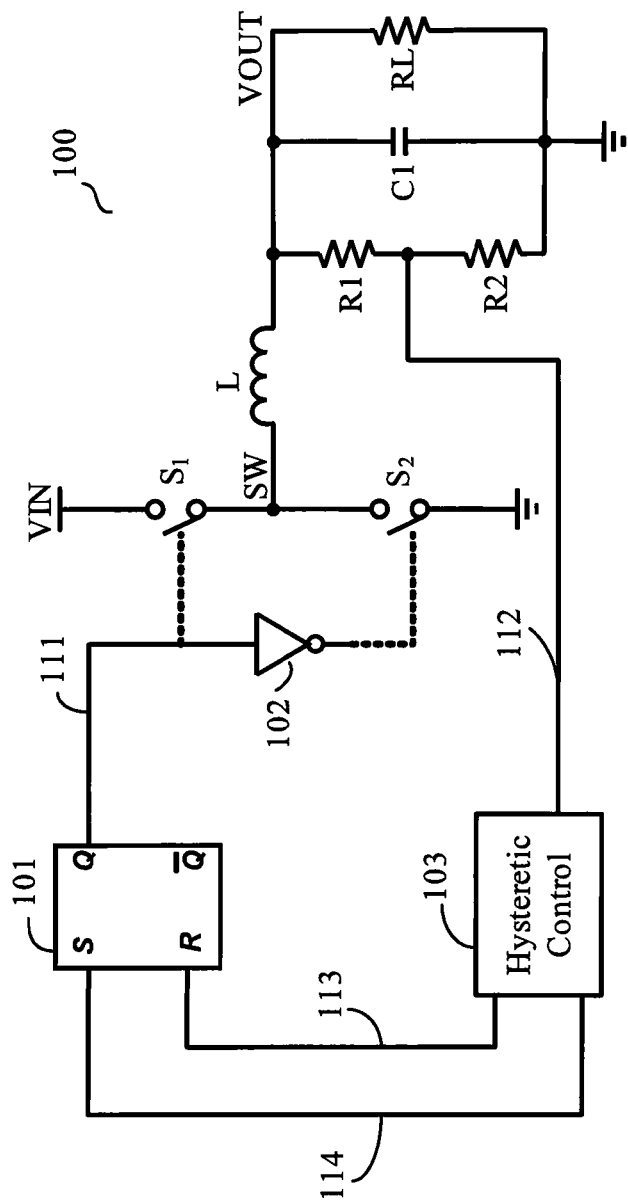
FIG. 1 schematically shows a prior art voltage regulator 100 with hysteretic control.
Figure 2:
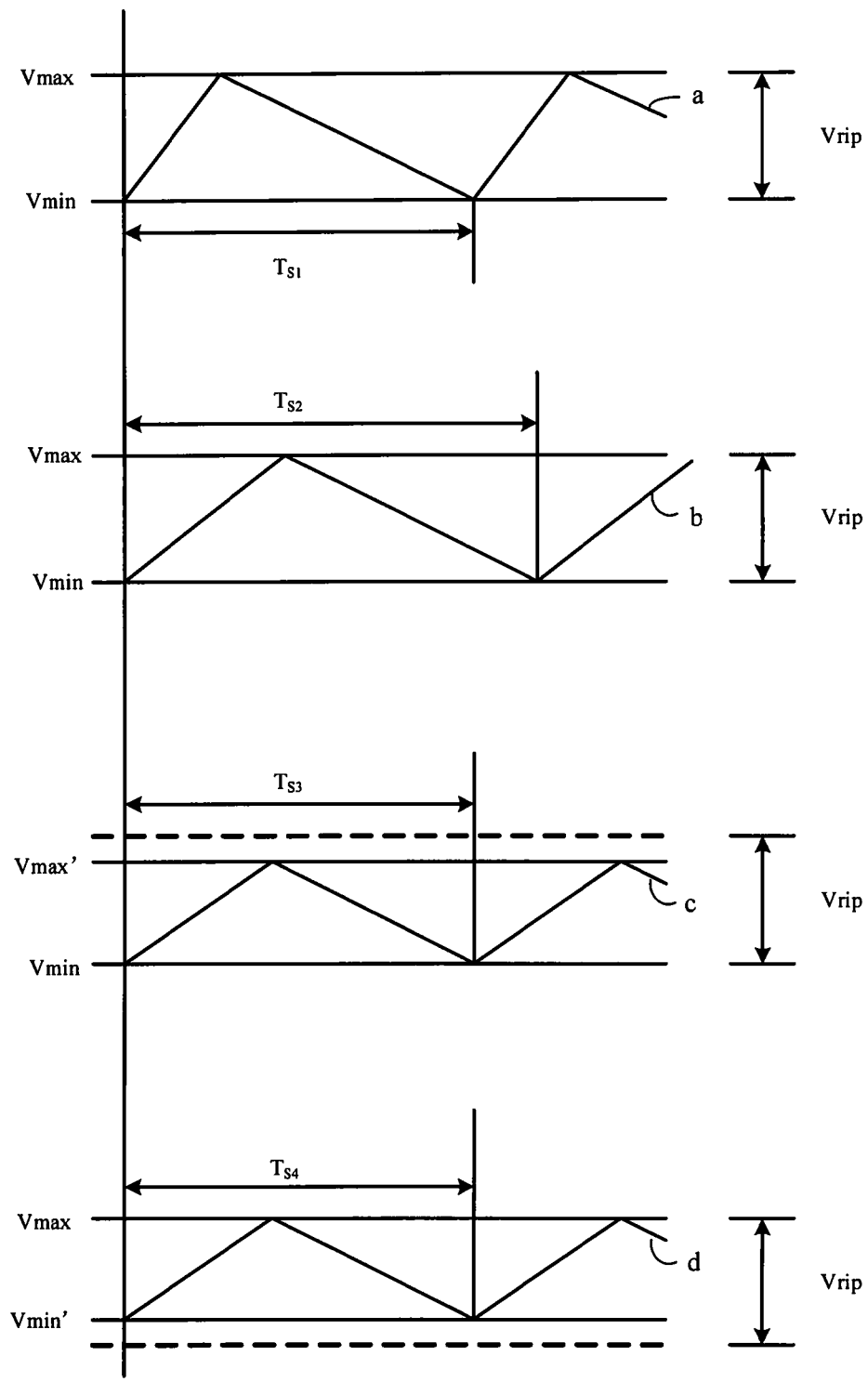
FIG. 2 shows an example timing diagram of the output voltage waveforms in a voltage regulator under different conditions.

Compared to the voltage regulator 100 in FIG. 1, the voltage regulator 300 in FIG. 3 feeds back the switching signal to the adaptive hysteretic control circuit 303, and the switching signal helps to get the adaptive upper threshold or lower threshold, the operation is described with reference to FIG. 4.

Figure 4:
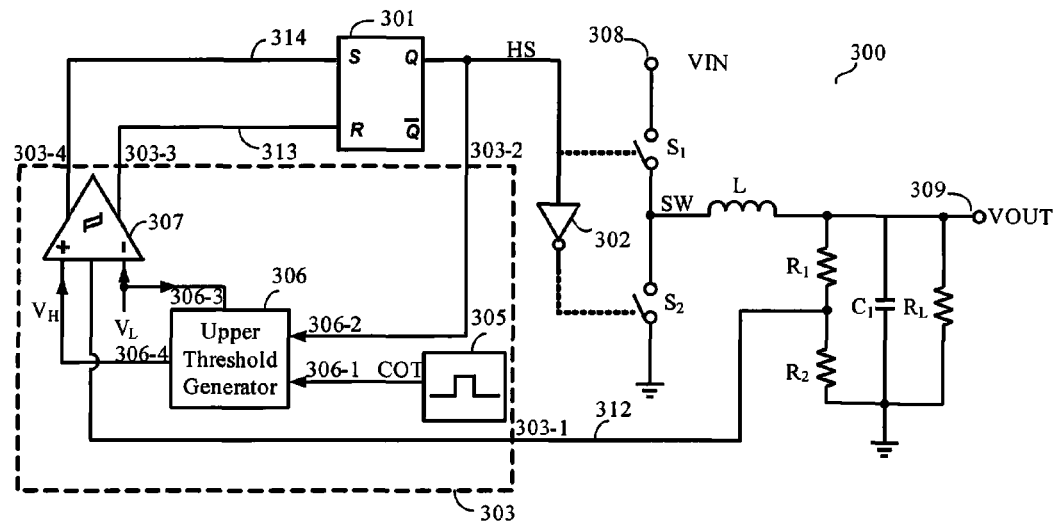
FIG. 4 schematically shows the voltage regulator 300 with detailed adaptive hysteretic control circuit in accordance with an embodiment of the present disclosure.

FIG. 4 schematically shows the voltage regulator 300 with detailed adaptive hysteretic control circuit 303 in accordance with an embodiment of the present disclosure. In one embodiment, the adaptive hysteretic control circuit 303 comprises: a constant on time circuit 305 configured to generate a constant on time signal COT, wherein the constant on time signal COT has a frequency independent of the input signal; an upper threshold generator 306 having a first input terminal 306-1, a second input terminal 306-2, a third input terminal 306-3, and an output terminal 306-4, wherein the first input terminal 306-1 is coupled to the constant on time circuit 305 to receive the constant on time signal COT, the second input terminal 306-2 is coupled to the second input terminal 303-2 of the adaptive hysteretic control circuit 303 to receive the switching signal HS, the third input terminal 306-3 is coupled to a lower threshold $V_L$ which is fixed, and wherein based on the constant on time signal COT, the switching signal HS, and the lower threshold $V_L$, the upper threshold generator 306 generates an upper threshold $V_H$ at the output terminal 306-4; and a window comparator 307 having a first input terminal, a second input terminal, a third input terminal, a first output terminal, and a second output terminal, wherein the first input terminal is coupled to the output voltage feedback signal 312, the second input terminal is coupled to the upper threshold generator 306 to receive the upper threshold $V_H$, the third input terminal is coupled to the lower threshold $V_L$, and wherein based on the output voltage feedback signal 312, the upper threshold $V_H$ and the lower threshold $V_L$, the window comparator 307 generates the first control signal 313 and the second control signal 314.

In one embodiment, the constant on time signal is a square-wave signal. Persons of ordinary skill in the art should know that the upper threshold is corresponding to the maximum limit of the output voltage VOUT, and the lower threshold is corresponding to the minimum limit of the output voltage VOUT. The lower threshold may be provided by a voltage source.

As mentioned hereinbefore, the voltage regulator 100 with hysteretic control limits the output voltage VOUT in a preset range by a window comparator 107. The voltage regulator 300 with adaptive hysteretic control limits the output voltage VOUT in a preset range by a window comparator 307 too. So the voltage regulator 300 with adaptive hysteretic control of the present disclosure has the inherent stability and fast transient response. The difference is: the voltage regulator 300 varies the upper threshold to maintain the voltage regulator at a fixed switching frequency. Persons of ordinary skill in the art should know that varying the lower threshold also obtains a fixed switching frequency without detracting the merits of the present disclosure.

Figure 5:
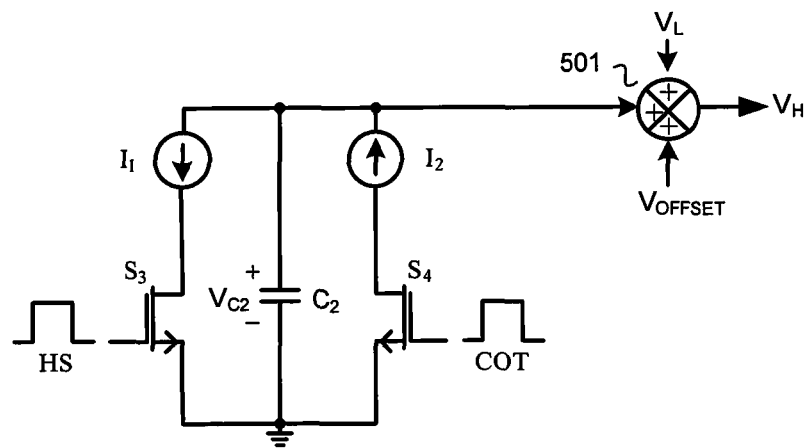
FIG. 5 schematically shows details of an upper threshold generator in accordance with an embodiment of the present disclosure.

FIG. 5 schematically shows details of an upper threshold generator in accordance with an embodiment of the present disclosure. The upper threshold generator comprises: a first current source $I_1$; a second current source $I_2$; a second capacitor $C_2$ having a first terminal and a second terminal; a third switch $S_3$; a fourth switch $S_4$; and a summator 501 having a first input terminal, a second input terminal, a third input terminal, and an output terminal, wherein the first current source $I_1$ and the third switch $S_3$ are coupled in series between the first terminal and the second terminal of the second capacitor $C_2$, the second current source $I_2$ and the fourth switch $S_4$ are coupled in series between the first terminal and the second terminal of the second capacitor $C_2$, and further wherein the first input terminal of the summator 501 is coupled to the first terminal of the second capacitor $C_2$ to receive a voltage across the second capacitor $C_2$, the second input terminal is coupled to the lower threshold, the third input terminal is coupled to an offset voltage $V_{OFFSET}$ indicative of a ripple of the output voltage in normal state, and wherein based on the voltage across the second capacitor $C_2$, the lower threshold, and the offset voltage, the summator 501 provides the upper threshold, the third switch $S_3$ is controlled by the switching signal HS; and the fourth switch $S_4$ is controlled by the constant on time signal COT.

In steady time, suppose $I_1=I_2$, it is seen from FIG. 5 that:

$$\text{If } T_{on\_HS}=T_{on\_COT} \rightarrow V_{C2}=0 \rightarrow V_H-V_L-V_{OFFSET}=0$$

$$\text{If } T_{on\_HS}<T_{on\_COT} \rightarrow V_{C2}>0 \rightarrow V_H-V_L-V_{OFFSET}>0$$

$$\text{If } T_{on\_HS}>T_{on\_COT} \rightarrow V_{C2}<0 \rightarrow V_H-V_L-V_{OFFSET}<0$$

Wherein $V_{C2}$ is the voltage across the second capacitor $C_2$, $T_{on\_HS}$ is the time when the switching feedback signal HS is high, $T_{on\_COT}$ is the time when the constant on time signal COT is high, $V_H$ is the upper threshold, and $V_L$ is the lower threshold. The lower threshold $V_L$ and the offset voltage $V_{OFFSET}$ are fixed in this embodiment, so the upper threshold voltage $V_H$ is varied according to the voltage across the second capacitor $C_2$. It rises when the second capacitor $C_2$ is charged and falls when the second capacitor $C_2$ is discharged.

By adjusting the upper threshold, the switching frequency is regulated to a fixed value which is the same with the constant on time signal COT.

Figure 6:
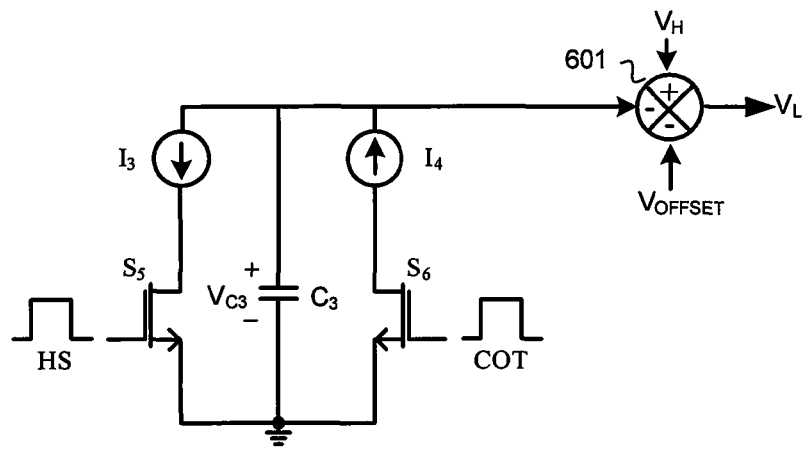
FIG. 6 schematically shows details of a lower threshold generator in accordance with an embodiment of the present disclosure.

Persons of ordinary skill in the art should know that adjusting the lower threshold achieves the same purpose of adaptive hysteretic control. FIG. 6 schematically shows details of a lower threshold generator in accordance with an embodiment of the present disclosure. In one embodiment, the lower threshold generator comprises: a third current source $I_3$; a fourth current source $I_4$; a third capacitor $C_3$ having a first terminal and a second terminal; a fifth switch $S_5$; a sixth switch $S_6$; and a subtractor 601 having a first input terminal, a second input terminal, a third input terminal, and an output terminal, wherein the third current source $I_3$ and the fifth switch $S_5$ are coupled in series between the first terminal and the second terminal of the third capacitor $C_3$, the fourth current source $I_4$ and the sixth switch $S_6$ are coupled in series between the first terminal and the second terminal of the third capacitor $C_3$, the first input terminal of the subtractor 601 is coupled to the first terminal of the third capacitor $C_3$ to receive a voltage across the third capacitor $C_3$, the second input terminal is coupled to the upper threshold, the third input terminal is coupled to an offset voltage $V_{OFFSET}$ indicative of a ripple of the output voltage in normal state, and wherein based on the voltage across the third capacitor $C_3$, the upper threshold, and the offset voltage $V_{OFFSET}$, the subtractor 601 provides the lower threshold, and wherein the fifth switch $S_5$ is controlled by the switching signal HS, and the sixth switch $S_6$ is controlled by the constant on time signal COT.

Persons of ordinary skill in the art should realize that the operation of the lower threshold generator is similar to the operation of the upper threshold generator.

Figure 7:
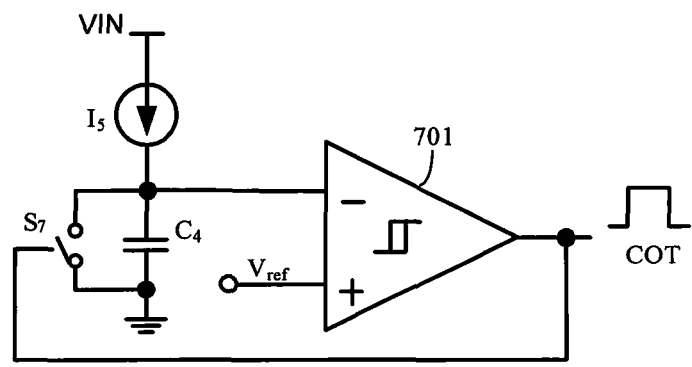
FIG. 7 schematically shows details of a constant on time generator in accordance with an embodiment of the present disclosure.

FIG. 7 schematically shows details of a constant on time generator in accordance with an embodiment of the present disclosure. In one embodiment, the constant on time circuit comprises: a fifth current source $I_5$ configured to supply a current signal proportional to the input signal; a fourth capacitor $C_4$ coupled to the fifth current source $I_5$ to be charged by the fifth current source $I_5$; a seventh switch $S_7$ coupled in parallel with the fourth capacitor $C_4$; a hysteretic comparator 701 having a first input terminal (the inverting terminal), a second input terminal (the non-inverting terminal), and an output terminal, wherein the first input terminal is coupled to the fourth capacitor $C_4$ to receive a voltage across the fourth capacitor $C_4$, the second input terminal is coupled to a reference voltage $V_{ref}$ proportional to the output voltage, and wherein based on the voltage across the fourth capacitor $C_4$ and the reference voltage $V_{ref}$, the hysteretic comparator provides the constant on time signal COT, and wherein the seventh switch $S_7$ is controlled to be on and off by the constant on time signal COT.

In one embodiment, before the voltage across the fourth capacitor $C_4$ reaches the reference voltage $V_{ref}$, the output of the hysteretic comparator is logical high, and the seventh switch $S_7$ is off. Accordingly, the fifth current source $I_5$ charges the fourth capacitor $C_4$. When the voltage across the fourth capacitor $C_4$ reaches the reference voltage $V_{ref}$, the output of the hysteretic comparator is turned over to be logical low, and the seventh switch $S_7$ is turned on to discharge the fourth capacitor $C_4$. The time the fourth capacitor $C_4$ being charged to reaches the reference voltage $V_{ref}$ is determined by the capacitance of the fourth capacitor $C_4$ and the charging current:

$$T_{on\_COT} = \frac{C_4 \times V_{ref}}{I_5} \tag{1}$$

So the time the constant on time signal $T_{on\_COT}$ is high (the time the comparator outputs high voltage) is controlled by adjusting the capacitance of the fourth capacitor $C_4$, the charging current $I_5$ and the reference voltage $V_{ref}$.

In one embodiment, the fifth current source $I_5$ is realized by supplying input voltage VIN to a resistor $R_{on}$, the reference voltage $V_{ref}$ may be obtained from the output voltage VOUT using a voltage divider. Assuming K is the coefficient of the reference voltage $V_{ref}$ to the output voltage VOUT, the current source $I_5$ and the reference voltage $V_{ref}$ are:

$$I_5 = \frac{VIN}{R_{on}},$$

$$V_{ref} = K \times VOUT$$

Replacing $I_5$ and $V_{ref}$ in equation (1) with the above equations, it is obtained that:

$$T_{on\_COT} = \frac{VOUT \times C_4}{VIN \times R_{on} \times K} = \frac{D \times C_4}{R_{on} \times K} \tag{2}$$

Because $$T_{on\_COT} = D \times T = \frac{D}{f} = \frac{D \times C_4}{R_{on} \times K},$$

the frequency f of the constant on time signal COT is:

$$f = K \times \frac{R_{on}}{C_4} \tag{3}$$

As being seen from equation (3), the frequency f of the constant on time signal COT may keep constant in a system where the coefficient K, the resistor $R_{on}$, and the capacitor $C_4$ are all fixed.

Figure 8:
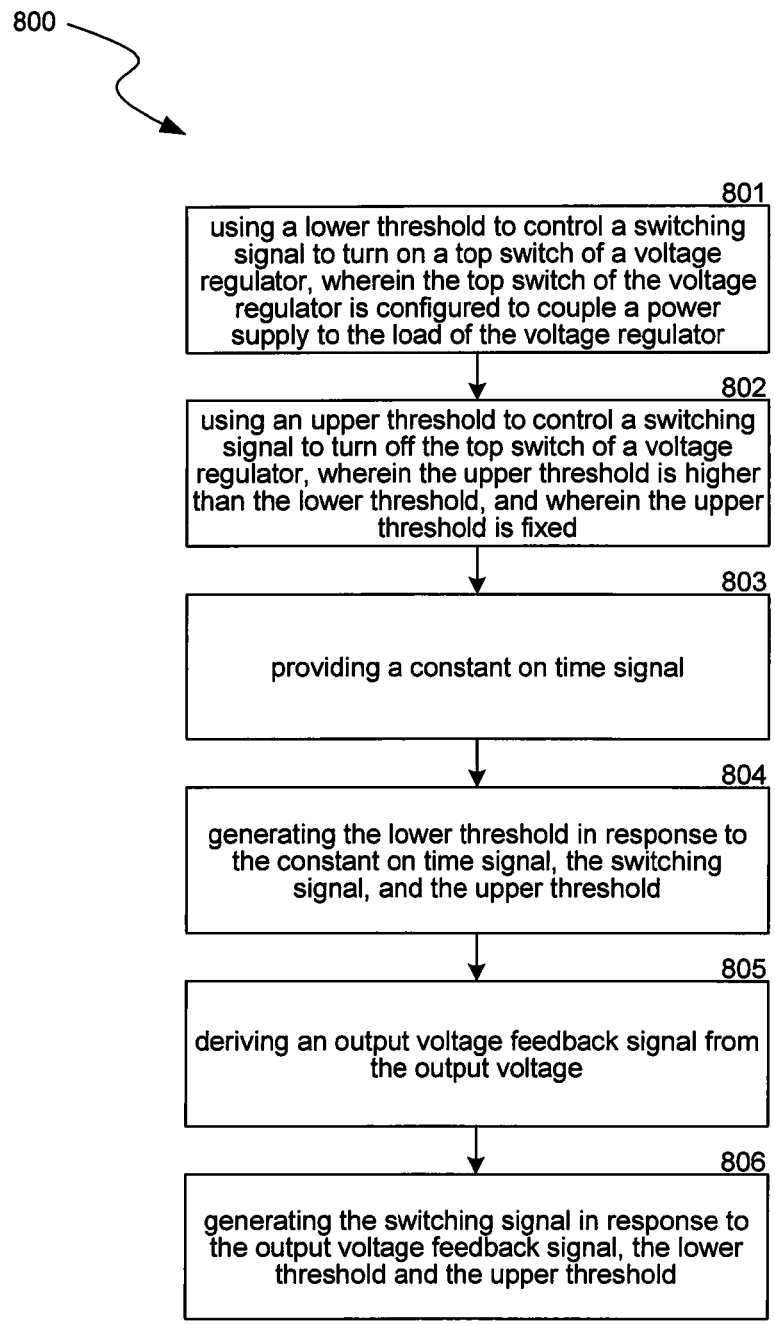
FIG. 8 shows a schematic flowchart 800 of a method of controlling a voltage regulator in accordance with an embodiment of the present disclosure.

Furthermore, the present disclosure discloses a method of controlling a voltage regulator. Referring to FIG. 8, a schematic flowchart 800 of the method is shown in accordance with an embodiment of the present disclosure. In the embodiment of FIG. 8, the method comprises: step 801, using a lower threshold to control a switching signal to turn on a top switch of a voltage regulator, wherein the top switch of the voltage regulator is configured to couple a power supply to the load of the voltage regulator; step 802, using an upper threshold to control the switching signal to turn off the top switch of the voltage regulator, wherein the upper threshold is higher than the lower threshold, and wherein the upper threshold is fixed; step 803, providing a constant on time signal; step 804, generating the lower threshold in response to the constant on time signal, the switching signal, and the upper threshold; step 805, deriving an output voltage feedback signal from the output voltage; and step 806, generating the switching signal in response to the output voltage feedback signal, the lower threshold, and the upper threshold.

In one embodiment, the step 804 comprises: charging a third capacitor by a fourth current source when the constant on time signal is high; discharging the third capacitor by a third current source when the switching signal is high; and subtracting a voltage across the charged capacitor and an offset voltage from the upper threshold, wherein the offset voltage is indicative of a ripple of the output voltage in normal state.

In one embodiment, the step 803 comprises: charging a fourth capacitor by a fifth current source, wherein the fifth current source provides a current signal proportional to the input signal; comparing a voltage across the fourth capacitor with a reference voltage proportional to the output voltage; generating the constant on time signal based on the comparison; and resetting the voltage across the fourth capacitor when the voltage across the fourth capacitor reaches the reference voltage.

Figure 9:
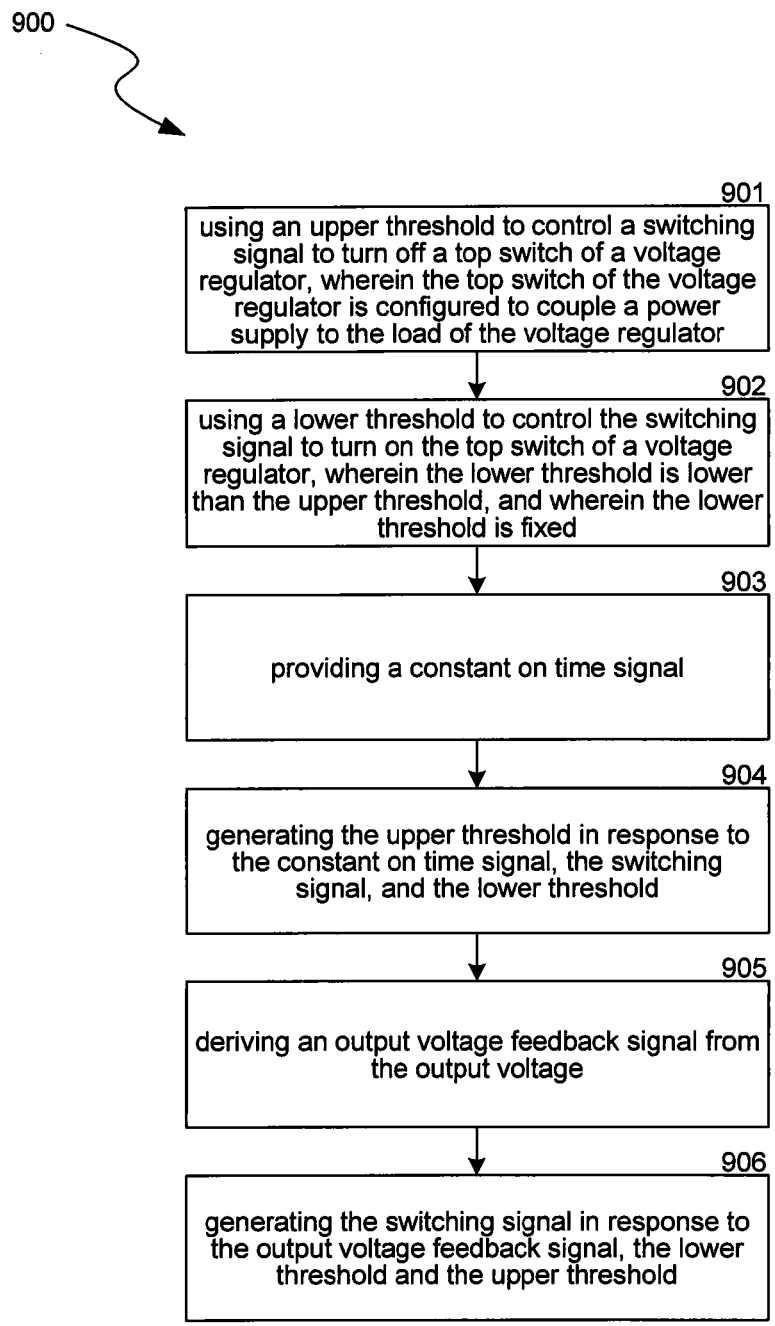
FIG. 9 shows a schematic flowchart 900 of a method of controlling a voltage regulator in accordance with an embodiment of the present disclosure.

FIG. 9 shows a schematic flowchart 900 of a method of controlling a voltage regulator in accordance with an embodiment of the present disclosure. The method comprises: step 901, using an upper threshold to control a switching signal to turn off a top switch of a voltage regulator, wherein the top switch of the voltage regulator is configured to couple a power supply to the load of the voltage regulator; step 902, using a lower threshold to control the switching signal to turn on the top switch of the voltage regulator, wherein the lower threshold is lower than the upper threshold, and wherein the lower threshold is fixed; step 903, providing a constant on time signal; step 904, generating the upper threshold in response to the constant on time signal, the switching signal, and the lower threshold; step 905 deriving an output voltage feedback signal from the output voltage; and step 906, generating the switching signal in response to the output voltage feedback signal, the lower threshold and the upper threshold.

In one embodiment, the step 904 comprises: charging a second capacitor by a second current source when the constant on time signal is high; discharging the second capacitor by a first current source when the switching signal is high; and adding a voltage across the charged capacitor and an offset voltage to the lower threshold, wherein the offset voltage is indicative of a ripple of the output voltage in normal state.

In one embodiment, the step 903 comprises: charging a fourth capacitor by a fifth current source, wherein the fifth current source provides a current signal proportional to the input signal; comparing a voltage across the fourth capacitor with a reference voltage proportional to the output voltage; generating the constant on time signal based on the comparison; and resetting the voltage across the fourth capacitor when the voltage across the fourth capacitor reaches the reference voltage.

Improved voltage regulators have been disclosed. While specific embodiments of the present disclosure have been provided, it is to be understood that these embodiments are for illustration purposes and not limiting. Many additional embodiments will be apparent to persons of ordinary skill in the art reading this disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A voltage regulator, comprising:
   an input port configured to receive an input signal;
   an output port configured to provide an output voltage;
   a first switch and a second switch coupled in series between the input port and ground, wherein the first and second switches are synchronously switched;
   an adaptive hysteretic control circuit having a first input terminal, a second input terminal, a first output terminal, and a second output terminal, wherein the first input terminal is coupled to an output voltage feedback signal indicative of the output voltage, the second input terminal is coupled to a switching signal, and wherein based on the output voltage feedback signal and the switching signal, the adaptive hysteretic control circuit generates a first control signal at the first output terminal, and a second control signal at the second output terminal; and
   a logic circuit having a first input terminal, a second input terminal, and at least one output terminal, wherein the first input terminal is coupled to the first output terminal of the adaptive hysteretic control circuit to receive the first control signal, the second input terminal is coupled to the second output terminal of the adaptive hysteretic control circuit to receive the second control signal, and wherein based on the first control signal and the second control signal, the logic circuit generates the switching signal at the output terminal to control the first switch and the second switch;
   wherein the output voltage feedback signal is limited between an upper threshold and a lower threshold, and wherein the upper threshold or the lower threshold is adjusted based on the switching signal and a constant on time signal having a square wave to achieve a constant switching frequency of the voltage regulator.

2. The voltage regulator of claim 1, wherein the adaptive hysteretic control circuit comprises:
   a constant on time circuit configured to generate the constant on time signal, wherein the constant on time signal has a frequency independent of the input signal;
   an upper threshold generator having a first input terminal, a second input terminal, a third input terminal, and an output terminal, wherein the first input terminal is coupled to the constant on time circuit to receive the constant on time signal, the second input terminal is coupled to the switching signal, the third input terminal is coupled to the lower threshold which is fixed, and wherein based on the constant on time signal, the switching signal, and the lower threshold, the upper threshold generator generates the upper threshold; and
   a window comparator having a first input terminal, a second input terminal, a third input terminal, a first output terminal, and a second output terminal, wherein the first input terminal is coupled to the output voltage feedback signal, the second input terminal is coupled to the upper threshold generator to receive the upper threshold, the third input terminal is coupled to the lower threshold, and wherein based on the output voltage feedback signal, the upper threshold and the lower threshold, the window comparator generates the first control signal and the second control signal.

3. The voltage regulator of claim 1, wherein the adaptive hysteretic control circuit comprises:
   a constant on time circuit configured to generate the constant on time signal;
   a lower threshold generator having a first input terminal, a second input terminal, a third input terminal, and an output terminal, wherein the first input terminal is coupled to the constant on time circuit to receive the constant on time signal, the second input terminal is coupled to the switching signal, the third input terminal is coupled to the upper threshold which is fixed, and wherein based on the constant on time signal, the switching signal and the upper threshold, the lower threshold generator generates the lower threshold; and
   a window comparator having a first input terminal, a second input terminal, a third input terminal, a first output terminal, and a second output terminal, wherein the first input terminal is coupled to the output voltage feedback signal, the second input terminal is coupled to the lower threshold generator to receive the lower threshold, the third input terminal is coupled to the upper threshold, and wherein based on the output voltage feedback signal, the upper threshold and the lower threshold, the window comparator generates the first control signal and the second control signal.

4. The voltage regulator of claim 1, wherein the logic circuit comprises a RS flip-flop.

5. The voltage regulator of claim 1, further comprising a voltage divider coupled to the output port to provide the output voltage feedback signal.

6. The voltage regulator of claim 2, wherein the constant on time circuit comprises:
   a fifth current source configured to supply a current signal proportional to the input signal;
   a fourth capacitor coupled to the fifth current source to be charged by the fifth current source;
   a seventh switch coupled in parallel with the fourth capacitor; and
   a hysteretic comparator having a first input terminal, a second input terminal, and an output terminal, wherein the first input terminal is coupled to the fourth capacitor to receive a voltage across the fourth capacitor, the second input terminal is coupled to a reference voltage proportional to the output voltage, and wherein based on the voltage across the fourth capacitor and the reference voltage, the hysteretic comparator provides the constant on time signal, and wherein the seventh switch is controlled to be on and off by the constant on time signal.

7. The voltage regulator of claim 2, wherein the upper threshold generator comprises:
a first current source;
a second current source;
a second capacitor having a first terminal and a second terminal;
a third switch;
a fourth switch; and
a summator having a first input terminal, a second input terminal, a third input terminal, and an output terminal, wherein
the first current source and the third switch are coupled in series between the first terminal and the second terminal of the second capacitor, and
the second current source and the fourth switch are coupled in series between the first terminal and the second terminal of the second capacitor, and further wherein
the first input terminal of the summator is coupled to the first terminal of the second capacitor to receive a voltage across the second capacitor, the second input terminal is coupled to the lower threshold, the third input terminal is coupled to an offset voltage indicative of a ripple of the output voltage in normal state, and wherein based on the voltage across the second capacitor, the lower threshold, and the offset voltage, the summator provides the upper threshold,
the third switch is controlled by the switching signal, and
the fourth switch is controlled by the constant on time signal.

8. The voltage regulator of claim 7, wherein
the second capacitor is discharged by the first current source when the third switch is on, and
the second capacitor is charged by the second current source when the fourth switch is on.

9. The voltage regulator of claim 3, wherein the constant on time circuit comprises:
a fifth current source configured to supply a current signal proportional to the input signal;
a fourth capacitor coupled to the fifth current source to be charged by the fifth current source;
a seventh switch coupled in parallel with the fourth capacitor; and
a hysteretic comparator having a first input terminal, a second input terminal, and an output terminal, wherein the first input terminal is coupled to the fourth capacitor to receive a voltage across the fourth capacitor, the second input terminal is coupled to a reference voltage, and wherein based on the voltage across the fourth capacitor and the reference voltage, the hysteretic comparator provides the constant on time signal, and wherein the seventh switch is controlled to be on and off by the constant on time signal.

10. The voltage regulator of claim 3, wherein the lower threshold generator comprises:
a third current source;
a fourth current source;
a third capacitor having a first terminal and a second terminal;
a fifth switch;
a sixth switch; and a subtractor having a first input terminal, a second input terminal, a third input terminal, and an output terminal, wherein
the third current source and the fifth switch are coupled in series between the first terminal and the second terminal of the third capacitor,
the fourth current source and the sixth switch are coupled in series between the first terminal and the second terminal of the third capacitor,
the first input terminal of the subtractor is coupled to the first terminal of the third capacitor to receive a voltage across the third capacitor, the second input terminal is coupled to the upper threshold, the third input terminal is coupled to an offset voltage indicative of a ripple of the output voltage in normal state, and wherein based on the voltage across the third capacitor, the upper threshold, and the offset voltage, the subtractor provides the lower threshold, and wherein
the fifth switch is controlled by the switching signal, and
the sixth switch is controlled by the constant on time signal.

11. The voltage regulator of claim 10, wherein
the third capacitor is discharged by the third current source when the fifth switch is on, and
the third capacitor is charged by the fourth current source when the sixth switch is on.

12. A method of controlling a voltage regulator which provides an output voltage to a load, the method comprising:
using a lower threshold to control a switching signal to turn on a top switch of the voltage regulator, wherein the top switch of the voltage regulator is configured to couple a power supply to the load of the voltage regulator;
using an upper threshold to control the switching signal to turn off the top switch of the voltage regulator, wherein the upper threshold is higher than the lower threshold, and wherein the upper threshold is fixed;
providing a constant on time signal having a square wave;
generating the lower threshold in response to the constant on time signal, the switching signal, and the upper threshold;
deriving an output voltage feedback signal from the output voltage; and
generating the switching signal in response to the output voltage feedback signal, the lower threshold, and the upper threshold.

13. The method of claim 12, wherein the generating the lower threshold in response to the constant on time signal, the switching signal, and the upper threshold comprises:
charging a third capacitor by a fourth current source when the constant on time signal is high;
discharging the third capacitor by a third current source when the switching signal is high; and
subtracting a voltage across the charged capacitor and an offset voltage from the upper threshold, wherein the offset voltage is indicative of a ripple of the output voltage in normal state.

14. The method of claim 12, wherein the providing a constant on time signal having a square wave comprises:
charging a fourth capacitor by a fifth current source, wherein the fifth current source provides a current signal proportional to an input signal of the voltage regulator;
comparing a voltage across the fourth capacitor with a reference voltage proportional to the output voltage of the voltage regulator;
generating the constant on time signal based on the comparison; and resetting the voltage across the fourth capacitor when the voltage across the fourth capacitor reaches the reference voltage.

15. A method of controlling a voltage regulator, the method comprising:

using an upper threshold to control a switching signal to turn off a top switch of the voltage regulator, wherein the top switch of the voltage regulator is configured to couple a power supply to the load of the voltage regulator;

using a lower threshold to control the switching signal to turn on the top switch of the voltage regulator, wherein the lower threshold is lower than the upper threshold, and wherein the lower threshold is fixed;

providing a constant on time signal having a square wave;

generating the upper threshold in response to the constant on time signal, the switching signal, and the lower threshold;

deriving an output voltage feedback signal from the output voltage; and generating the switching signal in response to the output voltage feedback signal, the lower threshold and the upper threshold.

16. The method of claim 15, wherein the generating the upper threshold in response to the constant on time signal, the switching signal, and the lower threshold comprises:

charging a second capacitor by a second current source when the constant on time signal is high;

discharging the second capacitor by a first current source when the switching signal is high; and adding a voltage across the charged capacitor and an offset voltage to the lower threshold, wherein the offset voltage is indicative of a ripple of the output voltage in normal state.

17. The method of claim 15, wherein the providing a constant on time signal having a square wave comprises:

charging a fourth capacitor by a fifth current source, wherein the fifth current source provides a current signal proportional to the input signal of the voltage regulator;

comparing a voltage across the fourth capacitor with a reference voltage proportional to the output voltage of the voltage regulator;

generating the constant on time signal based on the comparison; and resetting the voltage across the fourth capacitor when the voltage across the fourth capacitor reaches the reference voltage.

* * * * *